Oct. 3, 1950   C. P. GRAHAM   2,524,104
PLUG VALVE
Filed Feb. 19, 1945
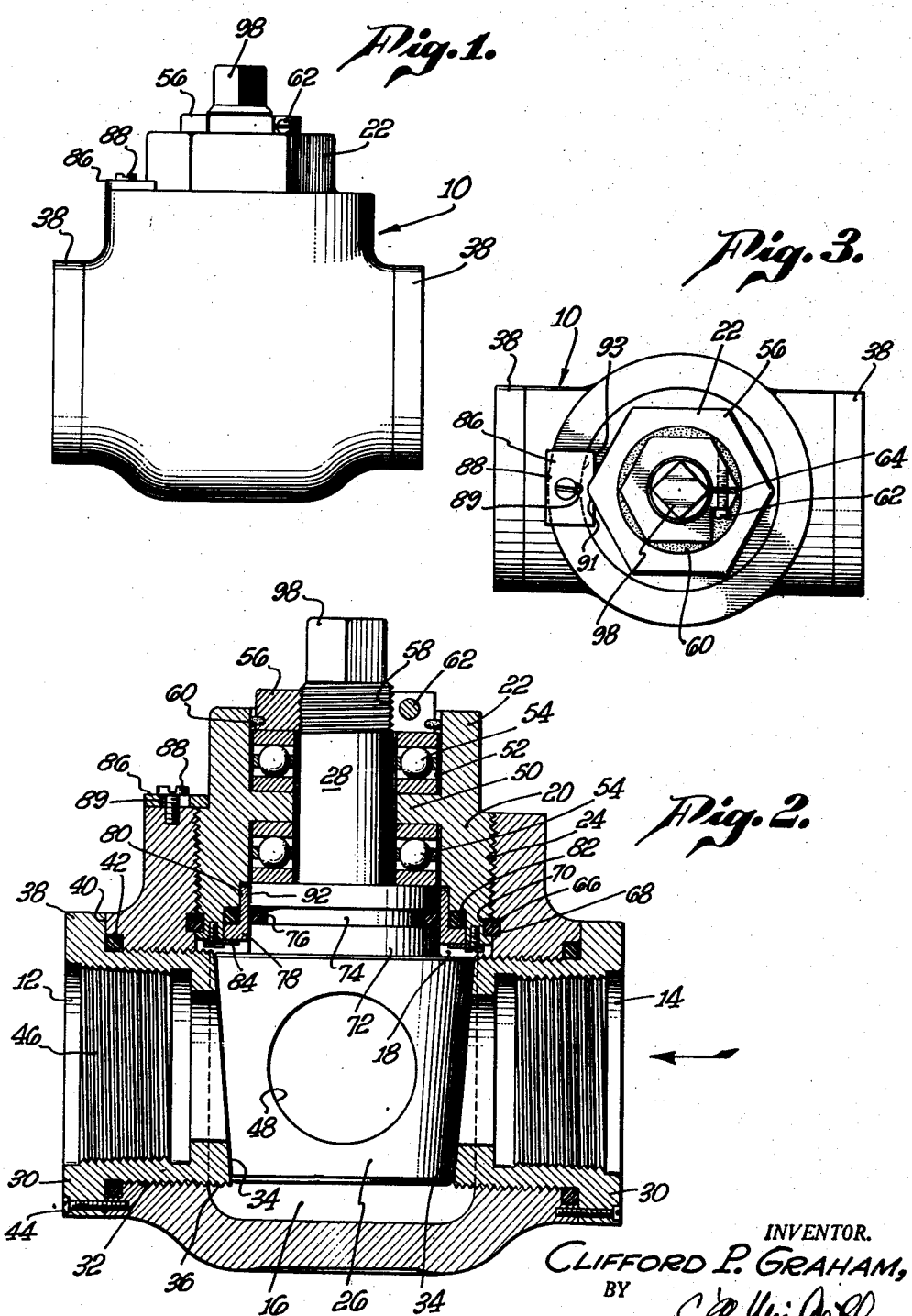
INVENTOR.
CLIFFORD P. GRAHAM,
BY
ATTORNEY.

Patented Oct. 3, 1950

2,524,104

UNITED STATES PATENT OFFICE 2,524,104

PLUG VALVE

Clifford P. Graham, Los Angeles, Calif.

Application February 19, 1945, Serial No. 578,636

4 Claims. (Cl. 251—113)

My invention relates to valves and particularly valves commonly designated as plug types valves designed particularly to accommodate liquids under relatively high pressure.

The plug valve here involved is designed so that it can be manufactured in relatively large sizes and also contemplates a valve which can be used for liquid lines and particularly lines which carry liquids of such a character that they tend to leave a residue or sediment in the valve after the liquid has been shut off. Some of these liquids are mud, oil and food products.

The valve therefore contemplates a construction which will permit the working parts to be flushed after the valve has been shut off in order to remove a substantial quantity of the residue and to keep the valve parts sufficiently clean so that they will continue in efficient operation.

It is therefore among the objects of my invention to provide a new and improved plug type valve which is so constructed that liquid is permitted to circulate freely around all the parts of the valve so that there will be a continuous tendency to wash away any sediment or residue which might otherwise collect, and also to utilize a simple and economical construction whereby difficulties heretofore encountered in grinding valve seats are obviated.

Another object of my invention is to provide a new and improved valve device wherein valve seats in the inlet and outlet ports are so constructed and installed that they may be removed for renovation or replacement whenever it should be necessary.

Still another object of my invention is to provide a new and improved plug valve device wherein the plug together with a mounting therefor may be removed as a unit to permit access to the interior of the valve device and also to permit cleaning of the plug valve and any parts of the device which may be attached thereto.

A further object is to provide in a plug valve device a combined plug valve, stem, and mounting all of which act as a unit and which can be applied to a valve body or removed therefrom by a relatively simple operation, the mounting likewise being such that a tight packing is provided between the valve plug and stem and the surrounding mounting, but which has incorporated into the mounting bearing means in order to permit a substantial amount of freedom of rotation of the plug valve with relation to its mounting.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Fig. 1 is a side elevational view of the valve device.

Fig. 2 is a longitudinal, sectional view of the valve device.

Fig. 3 is a plan view of the valve device.

Valves for handling liquids and gases under heavy pressure have been constructed in the past in considerable variety. The plug type valve, of course, is not essentially new, plug valves having been used to a great extent during the last half century. However, with the advent of greatly increased pressures in fluid lines, plug valves as they have been constructed in the past have been found unsatisfactory because of their relatively limited capacity to remain tight when the fluid line in which they are used is subjected to relatively high pressure. Where those high pressures have been encountered, a different type of valve has, as a general rule, been resorted to. There are, however, many structural advantages in the plug type of valve. Cheapness of construction, ease of assembly, and the fact that a relatively minimum amount of machining is necessary to fabricate them are items which greatly encourage the use of plug valves, wherever they can be modified and improved in order to accommodate high pressures. Whenever a plug type valve is to be used for pressures above those for which it is normally designed to accommodate, some special construction must be resorted to in order that a valve designed as plug valves must necessarily be may remain tight under all circumstances.

Prior art plug valves ordinarily attempted to apply line pressure to the top of the plug valve so as to wedge and seat the plug and thereby obtain a tight seal. Ordinarily, either a tremendous amount of force was required to move a plug valve, or complex arrangements were used whereby the plug was first raised off its seat and then turned. The valve of the present invention departs from prior practices in this regard, by permitting line pressure to act upon the bottom or smaller part of the plug valve so that sticking or freezing is eliminated. Moreover, the plug valve is arranged to permit minor but effective movement in the direction of inlets and outlets and a tight seal is made by line pressure acting upon one side of the plug, the other side thereupon making a tight seal with the seating ring on the outlet or low pressure side.

Another feature which has contributed to the need for a new valve of special construction is the tendency to use valves in liquid lines where the liquid is highly viscous and which may be forced through a liquid line only by resorting to a high pressure on the heavy-bodied liquid in order to drive it through a pipe line. Where liquids of such high viscosity are to be handled and plug valves are to be used, the plug valves must be very specially constructed in order that they can be manipulated between on and off position even though acting in a line where the pressure is so high that it would cause a plug valve of normal construction to stick.

I have therefore shown in the drawings for an embodiment of the invention here involved a valve device comprising a body 10 having an outlet port 12 and an inlet port 14. Within the valve body is a chamber 16 and at one side of the valve body, intermediate the outlet and inlet ports, there is an opening 18. A nut 20 having a hexagonal outer end 22 is threadedly secured to the inner threaded wall 24 of the opening. The nut is designed to carry and support a valve plug member including a plug element 26 and a stem 28.

In each of the outlet and inlet openings there is an insert in the form of a sleeve 30 which has a threaded engagement 32 with the wall of the outlet or inlet port, as the case may be. The sleeve has an inner edge or face 34 which is located entirely within the valve chamber and is spaced from the chamber wall by a projecting short portion 36 of the sleeve, for example, which because of the taper of the plug will be greater on one side of the sleeve than on the other.

The sleeve has a flange 38 at the outside end and when the sleeve is threaded into place upon the body, the flange will be pressed against an outwardly facing shoulder 40 of the valve body and will compress between itself and the body of a packing ring 42. The packing ring thus seals the line of contact between the outside of the insert and the valve body. Once the insert has been threaded into place it can be locked against any further rotation by means of a screw 44 extending laterally through the flange. At its inside surface 46, the insert may be threaded in order to accommodate a conventional pipe.

The plug valve element 26 has a tapered side wall and is normally seated upon the edges 34 of the inserts. This may be a lapped and ground fit in order to make the valve fluid-tight. It will be noted that the plug valve element seats only against the edges of the insert and does not in any way come into contact with the interior of the valve body at any point. As shown in the drawings, the plug valve element is designed to move through an angle of 90° between a full open and closed position. The position of the plug valve element in Fig. 2 is closed position, an opening through the plug valve being indicated by the circular aperture 48. Plug 26 and its integral stem 28 are rotatably positioned in the nut 20 in a preloaded condition whereby the plug is virtually immovable axially within the nut but is freely rotatable and capable of some slight transverse motion.

For mounting the plug valve element when outside of the valve body and for locating the plug element in operating position when it has been inserted into a valve chamber, the stem of the plug valve element and the nut 20 are secured together by a special construction. In the embodiment shown the nut has an inwardly directed flange 50 annular in shape and having a flat face on each side. The flange extends into a bore 52 centrally disposed relative to the normal position of the plug valve element.

A ring of roller bearings 54 is positioned one on each side of the flange 50 so that it rolls upon the flat face of the flange. At the outside end of the valve stem a bearing keeper ring 56 has been provided and is attached to the outer end of the valve stem by means of a threaded connection 58. If desired, there may be an oil-seal ring or a washer 60 between the outer bearing keeper ring and the bore in the nut. Once the bearing keeper ring is rotated upon the stem to the desired position, it can be clamped in that position by means of a screw 62 which is so positioned on opposite sides of a lateral split 64 in the nut that it will tend to draw the halves of the nut together.

To be sure that liquid pressure from within the fluid line will not leak out through the packing, should the valve be turned to open position, static-tight packing rings have been provided. A packing ring 66 is provided at the innermost corner adjacent the threads of the screw. A recess 68 in the adjacent portion of the body and a recess 70 at the inner outside corner of the nut provide a pocket within which the packing can be inserted and pressed into packing relationship with the adajacent parts.

The valve plug device is furthermore provided with a cylindrical and axially disposed boss 72. A crevass 74 extends annularly around the boss and provides a recess for another packing ring 76. Surrounding the packing ring but exterior with relation to the boss, there is provided a flanged, annular member 78 which forms a cover for the packing crevass and completely encloses it. The flange normally extends into a recess 80 on the inside wall extending inwardly with respect to the bore of the nut. Annular, flanged member 78 is rotatable independently of stem 28 and nut 20 and has some vertical or axial movement. Pressure acting on the member 78 tends to compress the ring 82. There is a second recess likewise within the nut which provides a receptacle for a packing ring 82. Individual anchoring clips 84 spaced about the circumference of the ring hold it in place.

For an additional means for locking the nut in proper relationship with respect to the body there is provided a locking plate 86 held in place by a machine screw 88 to prevent rotation of the nut and consequent loosening of the joint. The screw is located in a slot 89 which permits the plate to slide away from the nut when the screw is loosened. By having a notch 91 and a flat side 93 on the plate, it may be positioned against either a side or a corner of the nut and thereby provide a lock in twelve different positions.

In the operation of my device the valve may be inserted in a fluid line. Should the outside diameter of the fluid line be threaded to a size and pitch different from the size and pitch of the insert chosen, the insert may be removed and replaced by one of similar construction having the correct thread size and pitch. With the proper inserts in place the valve plug can be driven into the valve chamber and there ground and lapped against the inwardly protruding edges of the sleeves 30 in order to provide a valve seat action between them.

In a circumstance of this kind, should liquid be flowing in the direction of the arrow, that is to say, from right to left as viewed in Fig. 3, if there is an excess of pressure against the plug valve it will tend to shift it to a slight extent from right to left as viewed in Fig. 3, thereby pressing the somewhat sloping surfaces of the plug valve element against correspondingly sloping surfaces of the insert on the side opposite from which the pressure comes. Upon a reversal of pressure, the plug valve element would work in a similar manner against the inside end of the opposite sleeve.

By reason of the fact that the walls of the plug valve element as well as the top and bottom are spaced a substantial distance from the wall of the valve chamber, any liquid which the valve is designed to accommodate may be free to circulate entirely around the plug valve element except at the side which is seated against the next adjacent inside edge of the insert on the lefthand side of the vlave as viewed in Fig. 3.

So that a relatively large diameter plug type valve of this kind may not present too much frictional resistance and thereby inhibit opening of the valve with sufficient ease, a spring or fluid pressure loading on the valve plug has been eliminated. Instead, the stem of the valve plug is mounted upon roller bearings so that it will turn easily and which have been preloaded so that there will be no additional deflection of the bearings causing the valve mounting to loosen once it has been properly assembled. The lower bearing ring 54, in bearing against the underside of the flange 50, may act in the nature of a thrust bearing should there be any tendency to lift the valve from its seat. The upper bearing 54 on the opposite side of the flange 50 acts as a thrust bearing tending to prevent lateral displacement of the valve.

Packing for the valve stem includes the somewhat L-shaped flanged sleeve 78 which has an annular, flat, ring-like portion 92 positioned over the crevass 74 in the boss. By reason of the fact that the portion 92 extends entirely over the crevass, it tends to seat the static-tight packing between itself and the crevass. On the outside of the flange is the second static-tight packing 82 which fits within the space formed between the flanged sleeve and the nut. By means of this series of static-tight packing rings, the valve chamber is entirely sealed against any leaks past the somewhat composite valve stem member and its accompanying mounting. The areas covered by the packing have been kept intentionally rather narrow so that they present as little frictional resistance as possible to rotation of the valve.

When in operation the valve is to be turned to open position, the valve stem 28 may be rotated by means of applying a wrench to a squared end 98 and the valve turned so that the passage 48 is axially disposed relative to the inlet and outlet ports. There is little tendency for the valve plug to exert a great frictional resistance against turning even though closed under high pressure, because of the fact that there is no pressure tending to thrust the plug valve endwise into the chamber. The fluid pressure in the line tends to force the valve to a closed position only by reason of a lateral shift of very slight magnitude. This is sufficient to entirely seal the outlet port. When the valve is rotated toward open position, the frictional force between the edge only of the insert in the outlet port and the surface of the plug valve element will not be sufficient to supply any great resistance to rotation. It will be recalled that all of the rest of the surface of the plug valve element is entirely free of contact or at least free of pressure against any adjacent surface. Under these circumstances fluid will flush freely from the inlet port through the passage in the plug and outwardly from the outlet port. No matter how high the pressure during this stage, there will be little tendency for the fluid which may, by chance, pass into the valve chamber to be forced outwardly through the packing nut and its attendant elements.

When the valve is shut off the valve passage 48 extends laterally relative to the axes of the inlet and outlet ports so that the smooth surface of the plug valve element seats snugly against the end face of the outlet port insert and also against a corresponding face of the inlet port insert. Under these circumstances should the pressure be exceedingly great, its tendency will be to force the valve element laterally in order to form a tighter seal between the outside surface of the adjacent edge of the outlet port insert.

Should it be desired to flush the valve, the valve stem may be turned so that the plug valve element partially opens the valve. With the passage in the plug in this partially open position, fluid will be permitted to pass from the inlet port through the passage in the valve plug and then outwardly in part into the chamber 16, where it will be free to circulate around and, in effect, flush the chamber and adjacent areas.

Line pressure further facilitates opening the valve in that pressure in the chamber 16 beneath the plug 26 will tend to lift it. The plug, however, will be retained in proper position by action of the lower bearing ring 54 which serves as a thrust bearing against upward movement of the plug.

Should any part of the valve plug mounting need servicing or replacement, it is necessary only to unscrew the nut 20 from its position in the valve body and thereby withdraw all parts of the valve plug mounting as a single unit. If it is desired to keep the valve in service meanwhile, a replacement valve plug unit may be inserted. In order that the plug valve element will seat properly at all times the inserts previously described may be made of some metal softer than the valve plug which will permit easy grinding and lapping of the new plug valve element in place. By reason of the fact also that the inserts may be readily removed they also may be replaced by new inserts, finished at their inside edges to correspond to the slope and the contour of the outside of the plug valve element which can then be ground into place.

There has thus been provided a relatively heavy, hydraulic type of valve in which the moving parts are adapted to be inserted and removed as units and which has sufficient space about the moving parts within the valve chamber to permit relatively free flow of fluid carried by the valve device for flushing and cleaning purposes.

I claim:

1. A valve construction comprising: a body provided with a chamber having a bottom, diametrically opposed inlet and outlet ports in said body communicating with the chamber; removable valve seat elements in said inlet and outlet ports, said elements extending into said chamber and spaced from the bottom thereof; an internally threaded opening in said body intermediate said inlet and outlet ports; a plug valve provided with a stepped stem, said plug valve being seated on the seat elements with its base spaced from the bottom of the body chamber and the stem extending through the internally threaded opening; and a single, unitary, preloading and assembly nut having a smooth axial bore and provided with an inwardly extending annular flange intermediate the ends of said bore, said nut encircling the stem of the plug, said nut having a lower, externally threaded portion in threaded engagement with the bore of the body, an upper portion of polygonal external section, and a bearing on each side of the flange, the lower one of said bearings being between the flange and stepped stem.

2. A valve construction comprising: a body provided with a chamber having a bottom, diametrically opposed inlet and outlet ports in said body communicating with the chamber; removable valve seat elements in said inlet and outlet ports, said elements extending into said chamber and spaced from the bottom thereof; an internally threaded opening in said body intermediate said inlet and outlet ports; a plug valve provided with a stepped stem, said plug valve being seated on the seat elements with its base spaced from the bottom of the body chamber and the stem extending through the internally threaded opening; a single, unitary, preloading and assembly nut having a smooth axial bore and provided with an inwardly extending annular flange intermediate the ends of said bore, said nut encircling the stem of the plug, said nut having a lower, externally threaded portion in threaded engagement with the bore of the body, an upper portion of polygonal external section, and a bearing on each side of the flange, the lower one of said bearings being between the flange and stepped stem; and keeper means threadedly connected to the top of the stem for preloading the upper of said bearings.

3. A valve construction comprising: a body provided with a chamber having a bottom, diametrically opposed inlet and outlet ports in said body communicating with the chamber; removable valve seat elements in said inlet and outlet ports, said elements extending into said chamber and spaced from the bottom thereof; an internally threaded opening in said body intermediate said inlet and outlet ports; a plug valve provided with a stepped stem, said plug valve being seated on the seat elements with its base spaced from the bottom of the body chamber and the stem extending through the internally threaded opening; and a single, unitary, preloading and assembly nut having a smooth axial bore and provided with an inwardly extending annular flange intermediate the ends of said bore, said nut encircling the stem of the plug, said nut having a lower, externally threaded portion in threaded engagement with the bore of the body, an upper portion of polygonal external section, and a bearing on each side of the flange, the lower one of said bearings being between the flange and stepped stem, and a floating sealing ring below said bearing and above the plug valve.

4. A valve construction comprising: a body provided with a chamber having a bottom, diametrically opposed inlet and outlet ports in said body communicating with the chamber; removable valve seat elements in said inlet and outlet ports, said elements extending into said chamber and spaced from the bottom thereof; an internally threaded opening in said body intermediate said inlet and outlet ports; a plug valve provided with a stepped stem, said plug valve being seated on the seat elements with its base spaced from the bottom of the body chamber and the stem extending through the internally threaded opening; and a single, unitary, preloading and assembly nut having a smooth axial bore and provided with an inwardly extending annular flange intermediate the ends of said bore, said nut encircling the stem of the plug, said nut having a lower, externally threaded portion in threaded engagement with the bore of the body, an upper portion of polygonal external section, and a bearing on each side of the flange, the lower one of said bearings being between the flange and stepped stem, said plug valve being provided with a through passageway of a size adapted to establish communication between inlet and outlet ports and space between the bottom of the chamber and plug when said valve is in partly open position.

CLIFFORD P. GRAHAM.

REFERENCES CITED

The following references are of record in the file of this patent:

UNITED STATES PATENTS

| Number | Name | Date |
|---|---|---|
| 982,446 | Smith | Jan. 24, 1911 |
| 1,054,910 | DeMilt | Mar. 4, 1913 |
| 1,615,934 | Crowe | Feb. 1, 1927 |
| 1,783,655 | Vandeveer | Feb. 24, 1931 |
| 1,906,266 | Hoffman | May 2, 1933 |
| 1,976,052 | Whittle | Oct. 9, 1934 |
| 2,060,388 | Whittle | Nov. 10, 1936 |
| 2,088,937 | Aderhold | Aug. 3, 1937 |
| 2,307,443 | Atkinson | Jan. 5, 1943 |

FOREIGN PATENTS

| Number | Country | Date |
|---|---|---|
| 648,629 | France | Aug. 14, 1928 |